United States Patent [19]
Zanker et al.

[11] 3,860,623
[45] Jan. 14, 1975

[54] PRODUCTION OF ISOCYANATES

[75] Inventors: Fritz Zanker, Worms; Dietrich Mangold, Neckargemuend, both of Germany

[73] Assignee: Badische Anilin- & Soda-Fabrik Aktiengesellschaft, Rheinland-Pfalz, Germany

[22] Filed: Feb. 14, 1973

[21] Appl. No.: 332,291

[30] Foreign Application Priority Data
Mar. 3, 1972 Germany............................ 2210285

[52] U.S. Cl. ...................... 260/453 P, 260/453 PH
[51] Int. Cl. ........................................... C07c 119/04
[58] Field of Search .................. 260/453 P, 453 PH

[56] References Cited
UNITED STATES PATENTS

| | | | |
|---|---|---|---|
| 3,440,268 | 4/1969 | Stamm | 260/453 |
| 3,644,461 | 2/1972 | Rennells | 260/453 P |

Primary Examiner—Lewis Gotts
Assistant Examiner—Dolph H. Torrence
Attorney, Agent, or Firm—Johnston, Keil, Thompson & Shurtleff

[57] ABSTRACT

New and valuable process for the production of isocyanates by reaction of carbamyl halides with aliphatic olefins.

7 Claims, No Drawings

PRODUCTION OF ISOCYANATES

The present invention relates to a process for the production of isocyanates by reaction of carbamyl halides with aliphatic olefins.

It is known to produce isocyanates from carbamyl chlorides with organic bases such as tertiary amines or N,N-dialkylcarboxamides (German Laid-Open Application DOS 1,593,554) in organic solvents. It is also possible to obtain isocyanates with aqueous solutions or suspensions of inorganic bases such as alkali metal hydroxides, alkaline earth metal hydroxides, alkali metal carbonates, alkaline earth metal carbonates and alkali metal hydrogen carbonates (British Pat. No. 1,208,862).

It is further known from U.S. Pat. No. 3,465,023 that the formation of hydrogen chloride in isocyanate production reduces the reactivity of the end products; the removal or binding of the hydrogen chloride is therefore of importance in this process. Difficulties also occur in distilling the isocyanate. The disadvantage of prior art processes is that the isocyanates are formed in a medium in which they are susceptible decomposition. It is known for instance from Houben-Weyl, Methoden der organischen Chemie, 8, 136, 1952, that isocyanates dimerize in the presence of tertiary amines. They are extremely sensitive to aqueous alkali and are mostly converted into carbamates or carbamic acids even when stoichiometric amounts of aqueous alkali are used.

We have now found that, surprisingly, isocyanates of the formula $$R-N=C=O,$$

where R denotes an aliphatic, cycloaliphatic, araliphatic or aromatic radical, may be advantageously obtained from carbamyl halides of the formula

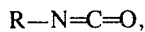

where R has the above meanings and X denotes a halogen atom, by eliminating hydrogen chloride when the reaction is carried out in the presence of olefins of the formula

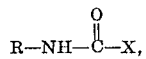

where $R^1$, $R^2$, $R^3$ and $R^4$ are identical or different and each denotes hydrogen or alkyl of 1 to 4 carbon atoms. It is not necessary to employ the carbamyl halide as such; it may also be produced in situ, e.g., by using instead a mixture of phosgene and an amine hydrohalide of the formula $$R-N^+H_3X^-,$$

where R and X have the above meanings.

If isopropylcarbamyl chloride and isobutylene are used, the reaction may be represented by the following formula:

$$(CH_3)_2CH-NH-CO-Cl + (CH_3)_2C=CH_2 \longrightarrow$$
$$(CH_3)_2CH-N=C=O + (CH_3)_3C-Cl$$

If isopropylcarbamyl chloride is produced in situ, the reaction may be represented as follows:

$$(CH_3)_2CH-N^+H_3Cl^- + COCl_2 \longrightarrow$$
$$(CH_3)_2CH-NH-CO-Cl + 2\ HCl$$

$$(CH_3)_2CH-NH-CO-Cl + 2\ HCl + 3\ (CH_3)_2C=CH_2$$
$$\longrightarrow (CH_3)_2CH-N=C=O + 3\ (CH_3)_3C-Cl.$$

Compared with prior art processes the process of the invention provides, in a simpler and more economic manner, isocyanates in good (space-time) yields and high purity. The problems encountered in distillation and those resulting from a reduction in the reactivity of the end products do not occur to any appreciable degree.

Preferred starting materials and consequently preferred end products are those in whose formula R denotes alkyl of 1 to 12, preferably 1 to 6, carbon atoms, alkenyl of 2 to 6 carbon atoms, alkynyl of 2 to 6 carbon atoms; cycloalkyl of 5 to 8 carbon atoms to which a 5- or 6-membered alicyclic ring may be fused via 2 or 3 common carbon atoms, alkyl of 1 to 6 carbon atoms substituted by cycloalkyl of 5 to 6 carbon atoms to which a 5- or 6-membered alicyclic ring may be fused via 2 or 3 common carbon atoms, aralkyl of 7 to 12 carbon atoms, phenyl, or naphthyl, and X denotes a bromine atom or, preferably, a chlorine atom. The above radicals may also be substituted by groups and/or atoms inert under the reaction conditions, e.g., alkyl of 1 to 5 carbon atoms, alkoxy of 1 to 5 carbon atoms, alkylthio of 1 to 5 carbon atoms, carbalkoxy of 2 to 5 carbon atoms, alkenyl of 2 to 5 carbon atoms, alkynyl of 2 to 5 carbon atoms, chloro, fluoro, bromo, trifluoromethyl, nitrile, phenylthio, cyclohexylthio, and benzylthio.

The following are examples of suitable starting materials: methyl, ethyl, *n*-propyl, isopropyl, *n*-butyl, isobutyl, sec-butyl, tert-butyl, 2-methylbutyl-(1), 3-methylbutyl-(1), 2-methylbutyl-(2), 3-methylbutyl-(2), pentyl-(1), pentyl-(2), pentyl-(3), neo-pentyl, *n*-hexyl, *n*-octyl, chloromethyl, 2-chloroethyl, 3-chloropropyl, 4-chlorobutyl, 6-chlorohexyl, 1-chloropropyl-(2), 1-chlorobutyl-(2), chloro-tert-butyl, bromo-tert-butyl, 1,1-bis-chloromethylethyl-(1), tris-chloromethylmethyl, allyl, 3,3-dimethylallyl-(3), 3-methyl-3-ethylallyl-(3), butyn-(1)-yl-(3), 3-methylbutyn-(1)-yl-(3), 3-methylpentyn-(1)-yl-(3), 1-ethynylcyclohexyl, cyclopentyl, cyclohexyl, methylcyclohexyl, cyclooctyl, norbornyl-(2), 1-norbornyl-(2)-ethyl-(1), 2-methoxyethyl, 2-ethoxyethyl, 3-methoxypropyl, 3-ethoxypropyl, 1-methoxybutyl-(2), 1-*n*-propoxypropyl-(2), methoxy-tert-butyl, ethoxy-tert-butyl, 2-methylthioethyl, 2-ethylthioethyl, 3-methylthiopropyl, 3-ethylthiopropyl, 1-methylthiobutyl-(2), 1-*n*-propylthiopropyl-(2), phenylthio-tert-butyl, cyclohexylthio-tert-butyl, benzylthio-tert-butyl, 5-cyanopentyl, carbethoxymethyl, phenyl, *p*-chlorophenyl, 3,4-dichlorophenyl, 2,4-dichlorophenyl, 3,5-dichlorophenyl, 2,4,5-trichlorophenyl, *p*-fluorophenyl, *p*-bromophenyl, 3-trifluoromethylphenyl, 2-trifluoromethyl-4-chlorophenyl, 2-chloro-4-methylphenyl, 3,4-dimethylphenyl, 3,5-dimethylphenyl, 4-ethylthiophenyl, 3-methoxyphenyl, 4-ethoxyphenyl, 3-cyanophenyl, 4-carbomethoxyphenyl, benzyl, 4-cyanobenzyl and α-naphthylcarbamyl chlorides and corresponding carbamyl bromides.

Examples of suitable olefins are propylene, butene-(1), cis-butene-(2), trans-butene-(2), isobutylene, pentene-(1), pentene-(2), 2-methylbutene-(1), 2-methylbutene-(2), hexene-(1), hexene-(2), hexene- (3), 2-methylpentene-(2), 3-methylpentene-(2), 2,3-dimethylbutene-(1), 2,3-dimethylbutene-(2), and diisobutylene and mixtures thereof.

The reaction is advantageously carried out in a molar ratio of carbamyl halide to olefin of from 1 : 0.9 to 1 : 4, preferably from 1 :1 to 1 : 2, in the case of in situ production of the carbamyl halide in a molar ratio of amine hydrohalide to phosgene to olefin of from 1 :0.9 : 3 to 1 :3 : 6, preferably from 1 : 1 : 3 to 1 : 2 : 5; at a temperature of from 50° to 250°C, preferably 80° to 190°C; at atmospheric or preferably superatmospheric pressure; and continuously or batchwise. The reaction is carried out in organic solvents inert under the reaction conditions, e.g., aliphatic or cycloaliphatic hydrocarbons such as petroleum ether, ligroin, pentane, hexane, heptane, cyclohexane, methylcyclohexane; chlorinated hydrocarbons such as methylene chloride, chloroform, carbon tetrachloride, dichloroethane, trichloroethylene; aromatic hydrocarbons such as benzene, toluene, xylene, mesitylene, chlorobenzene, dichlorobenzene, trichlorobenzene, chloronaphthalene; ethers, such as diethyl ether, diisopropyl ether, tetrahydrofuran, dioxane; esters, such as ethyl acetate, butyl acetate; ketones, such as acetone, methyl ethyl ketone, cyclohexanone; nitriles, such as acetonitrile; amides such as dimethylformamide; and sulfoxides, such as dimethyl sulfoxide, and mixtures thereof, or expediently without a solvent.

The reaction may be carried out as follows. A mixture of carbamyl halide (or amine hydrohalide and phosgene), olefin and possibly solvent is brought to reaction temperature while stirring in an autoclave and kept at this temperature for from 10 minutes to 20 hours. After completion of the reaction any phosgene remaining is removed, for instance by purging with nitrogen, and the usually liquid residue is worked up by fractional distillation, possibly also by crystallization of the isocyanate. Another course is to abandon the expulsion of phosgene with nitrogen, for instance in those cases in which the olefin and the alkyl halide obtained as byproducts from the olefin have a lower boiling point than the isocyanate formed and to fractionate direct. In continuous operation, for example, the carbamyl chloride and the olefin, both being if desired preheated to the requisite reaction temperature, may be pumped in the abovementioned reaction time through a reactor heated at the reaction temperature, the discharge cooled and worked up as described above.

The alkyl halide obtained by byproduct in both the continuous and batchwise methods may be converted into, inter alia, the olefin, for example thermally or by treating with water or an aqueous base, and reused in the reaction.

The isocyanates prepared by the process of the invention are valuable starting materials for the preparation of plant protection agents, pesticides, dyes, synthetic resins, plastics, water repellants for textile finishing, detergents, bleaches and adhesives. The fact that they can be reacted to urethanes, e.g., for use as foams or high molecular weight coatings having high flexibility, or ureas is of special importance. With regard to utility, reference may be made to Ullmanns Encyklopädie der technischen Chemie, 9, pp. 11, 12, 404 and 17, p. 204.

The parts in the following examples are by weight and bear the same relation to parts by volume as the kilogram to the liter.

EXAMPLE 1 a. 95.5 parts of isopropylamine hydrochloride and 94 parts of toluene are placed in an autoclave of Hastelloy C material (mainly Cr, Ni, Mo, Fe alloy); 225 parts of isobutylene and 150 parts of phosgene are then introduced. The whole is then stirred for 15 hours at 110°C; a pressure of 15 atmospheres gauge is thus created. Upon completion of the reaction the discharge is fractionated. There is obtained 81 parts (89 percent of theory) of isopropyle isocyanate, containing the impurities toluene (2.1 percent by weight) and tert-butyl chloride (4.2 percent by weight). The boiling point of the product is 72° to 76°C.

b. The same reaction with 93.5 parts by allylamine hydrochloride provides allyl isocyanate in a yield of 73 percent of the theory and contaminated with 3 percent of toluene. The boiling point of the product is 89° to 91°C.

EXAMPLE 2

115 parts of isopropylamine hydrochloride, 270 parts of isobutylene and 180 parts of phosgene are heated in a stirred autoclave of Hastelloy C material for 15 hours at 110°C. A pressure of 15 atmospheres gauge is thus created. After cooling, the contents of the autoclave are fractionated. There is obtained 97 parts (92 percent of theory) of 97 percent isopropyl isocyanate, containing as impurity 3 percent of tert-butyl chloride. The boiling point of the product is 72° to 77°C.

The same reaction with 81.5 parts of ethylamine hydrochloride provides ethyl isocyanate (b.p.: 61° to 62°C) in a yield of 86 to 87 percent of theory. The same reaction with 115 parts of n-propylamine hydrochloride provides 91 parts (72 percent of theory) of 95 percent n-propyl isocyanate, containing as impurity 4 to 5 percent of tert-butyl chloride. The boiling point of the product is 79° to 81°C.

EXAMPLE 3

364 parts of crude isopropylcarbamyl chloride (containing the impurities isopropylamine hydrochloride (2 to 3 percent) and isopropyl isocyanate (2 to 3 percent) and 220 parts of isobutylene are heated in a stirred autoclave of Hastelloy C material for 30 minutes at 110°C. The mixture is cooled and suction filtered (filter residue: 4 parts) and the filtrate fractionated. There is obtained 210 parts (78 percent of theory) of 95 percent isopropyl isocyanate, containing as impurity 5 percent of tert-butyl chloride. The boiling point of the product is 70° to 76°C.

The same reaction with 371 parts of sec-butylcarbamyl chloride provides a 71 percent yield of sec-butyl isocyanate boiling at 100° to 102°C. The same reaction with 410 parts of 2-methylthiopropylcarbamyl chloride-(2) provides 79 percent of theory of 2-methylthiopropyl isocyanate-(2) boiling at 75° to 77°C (20 mm); with 395 parts of butyn-(1)-ylcarbamyl chloride-(3) 75 percent of theory of butyn-(1)-yl isocyanate-(3) boiling at 104°C; and with 364 parts of 1-chloropropylcarbamyl chloride-(2) 69 percent of theory of 1-chloropropyl isocyanate-(2) boiling at 52° to 53°C (18 mm).

EXAMPLE 4 a. 131 parts of n-butylamine hydrochloride, 270 parts of isobutylene and 180 parts of phosgene are heated for 10 hours in a stirred autoclave at 130°C. A pressure of 15 atmospheres is thus created. After cooling and fractionating there is obtained 110 parts (92 percent of theory) of pure n-butyl isocyanate, boiling point: 114° to 116°C.

b. When 131 parts of isobutylamine hydrochloride is used, the yield of isobutyl isocyanate is 86 to 87 percent of theory. The product boils at 102° to 105°C.

EXAMPLE 5

In a stirred autoclave of Hastelloy C material 109 parts of propylene is added to 364 parts of crude isopropylcarbamyl chloride (impurities: 2 to 3 percent isopropyl isocyanate and 2 to 3 percent isopropylamine hydrochloride) and the mixture stirred for 5 hours at 140°C, a pressure of 48 atmospheres gauge being created. After cooling, fractional distillation is carried out. Isopropyl isocyanate yield: 179 parts (77 percent of theory). Boiling point: 72° to 75°C.

EXAMPLE 6 a. 37 parts of crystalline 1-ethynylcyclohexylcarbamyl chloride-(1) is introduced, together with 40 parts of benzene, into a shaking autoclave and 15 parts of isobutylene is then pumped in. The whole is kept for 4 hours at 130°C and then cooled; tert-butyl chloride and benzene are withdrawn in vacuo. The residue is distilled under an oil pump vacuum.

Yield: 23.9 parts of pure 1-ethynylcyclohexyl isocyanate-(1) (80 percent of theory).

Boiling point (0.3 mm): 27° to 28°C.

b. The same reaction with 18.7 parts of crystalline methylcarbamyl chloride provides a 69 percent of methyl isocyanate, b.p.: 38° to 40°C; with 31 parts of crystalline phenylcarbamyl chloride an 86 percent yield of phenyl isocyanate, b.p. (15 mm): 53° to 55°C; with 34 parts of benzylcarbamyl chloride a 73 percent yield of benzyl isocyanate, b.p. (10 mm): 82° to 84°C; with 30.7 parts of β-methylthioethylcarbamyl chloride a 79 percent yield of β-methylthioethyl isocyanate, b.p. (27 mm): 83° to 85°c; and with 23.3 parts of cyclohexylcarbamyl chloride a yield of 87 percent of theory of cyclohexyl isocyanate, b.p. (12 mm): 56°C.

The same reaction with 27.1 parts of tert-butylcarbamyl chloride in 60 ml of methylene chloride instead of benzene provides a tert-butyl isocyanate yield of 67 percent of theory. Boiling point: 85°C.

In the same reaction, the yield of 38.7 parts of 3-n-butoxypropylcarbamyl chloride in 70 ml of ethyl acetate instead of benzene is 83 percent of theory of 3-n-butoxypropyl isocyanate, b.p. (11 mm): 74° to 77°C; the yield of 33.1 parts of ethyl chlorocarbamoylacetate in 80 parts of ethyl acetate instead of benzene is 66 percent of theory of ethyl isocyanatoacetate, b.p. (13 mm): 67° to 69°C; the yield of 40 parts of 2-methyl-4-chlorophenylcarbamyl chloride in 70 parts of ethyl acetate instead of benzene is 89 percent of theory of 2-methyl-4-chlorophenyl isocyanate, b.p. (0.3 mm): 49°C; and the yield of 40.3 parts of 1-norbornyl-(2)-ethylcarbamyl chloride-(1) in 70 parts of ethyl acetate instead of benzene is 81 percent of theory of 1-norbornyl-2-ethyl isocyanate, b.p. (23 to 24 mm): 97° to 99°C.

EXAMPLE 7

23.3 parts of methylcarbamyl chloride, 31.5 parts of 2-methylpentene-(1) and 30 parts of toluene are heated in a Hastelloy C autoclave for 2 hours at 120°C. The filtered reactor effluent (residue 4 parts) is distilled.

Yield: 12.3 parts (87 percent of theory) of methyl isocyanate.

Boiling point: 39° to 41°C.

EXAMPLE 8

43.8 parts of ehtylcarbamyl chloride and 50.4 parts of diisobutylene are heated in a Hastelloy C shaking autoclave for 3 hours at 110°C. The total discharge, which contains solid product, is subjected to distillation.

Yield of ethyl isocyanate: 7.8 parts (27 percent of theory).

Boiling point: 61° to 62°C.

We claim:

1. In a process for producing an isocyanate of the formula

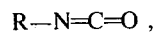

where R denotes alkyl of 1 to 12 carbon atoms, alkynyl of 2 to 6 carbon atoms, cycloalkyl of 5 to 8 carbon atoms to which a 5-or 6-membered alicyclic hydrocarbon ring may be fused via 2 or 3 common carbon atoms, alkyl of 1 to 6 carbon atoms substituted by cycloalkyl of 5 to 6 carbon atoms to which a 5- or 6-membered alicyclic hrdrocarbon ring may be fused via 2 or 3 common carbon atoms, aralkyl of 7 to 12 carbon atoms, phenyl, naphthyl or the same radicals bearing substituents which are inert under the reaction conditions, by eliminating hydrogen halide from a carbamyl halide of the formula

R—NH—CO—X, where R has the above meanings and X denotes bromine or chlorine, which comprises carrying out the reaction in the presence of a hydrogen halide binding agent consisting essentially of an olefin of the formula

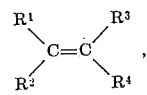

where $R^1$, $R^2$, $R^3$ and $R^4$ are identical or different and each denotes hydrogen or alkyl of 1 to 4 carbon atoms.

2. A process as claimed in claim 1 wherein there is used in place of the carbamyl halide a mixture of an amine hydrohalide of the formula

where R and X have the meanings given in claim 1, and phosgene.

3. A process as claimed in claim 1 wherein the reaction is carried out in a molar ratio of carbamyl halide to olefin of from 1 : 0.9 to 1 : 4 and at a temperature of about 50° to 250°C.

4. A process as claimed in claim 2 wherein the reaction is carried out in a molar ratio of amine hydrohalide to phosgene to olefin of about 1 : 0.9 : 3 to 1 : 3 : 6 and at a temperature of about 50° to 250° C.

5. A process as claimed in claim 1 wherein the reaction is carried out in an organic solvent which is inert under the reaction conditions.

6. A process as claimed in claim 1 wherein the reaction is carried out under superatmospheric pressure.

7. A process as claimed in claim 1 wherein the olefin is a member selected from the group consisting of propylene, butene-(1), butene-(2), trans-butene-(2), isobutylene, pentene-(1), pentene-(2), 2-methylbutene-(1), 2-methylbutene-(2), hexene-(1), hexene-(2), hexene-(3), 2-methylpentene-(2), 3-methylpentene-(2), 2,3-dimethylbutene-(1), 2,3-dimethylbutene(2), diisobutylene and mixtures thereof.

* * * * *